United States Patent [19]

Wong

[11] Patent Number: 5,091,260
[45] Date of Patent: Feb. 25, 1992

[54] REDUCTION OF CORROSION OF METALS

[75] Inventor: Chun S. Wong, Kingston, Canada

[73] Assignee: Du Pont Canada Inc., Mississauga, Canada

[21] Appl. No.: 401,301

[22] Filed: Aug. 31, 1989

[30] Foreign Application Priority Data

Sep. 5, 1988 [GB] United Kingdom ............... 8820807

[51] Int. Cl.$^5$ ............................................. B32B 15/08
[52] U.S. Cl. ............................... 428/461; 106/14.27; 106/14.41; 106/14.44; 427/327; 427/409; 427/398.1; 428/516; 524/439
[58] Field of Search ............... 106/14.27, 14.05, 14.41, 106/14.44; 427/327, 398.1, 402, 388.1, 388.2, 385.5, 409, 27, 185, 195, 423; 428/461, 516; 524/439, 531

[56] References Cited

U.S. PATENT DOCUMENTS

| Re. 30,006 | 5/1979 | Sakayori et al. | 427/27 |
|---|---|---|---|
| 3,941,609 | 3/1976 | Stern | 106/14.44 |
| 4,110,117 | 8/1978 | McLeod | 106/14.44 |
| 4,232,086 | 11/1980 | Mori et al. | 427/375 |
| 4,345,004 | 8/1982 | Miyata et al. | 427/27 |
| 4,370,382 | 1/1983 | Salensky | 524/439 |
| 4,612,155 | 9/1986 | Wong et al. | 264/176.1 |
| 4,737,547 | 4/1988 | White | 525/193 |
| 4,824,736 | 4/1989 | Ehrig et al. | 428/626 |
| 4,888,394 | 12/1989 | Boudreaux, Jr. | 525/285 |

FOREIGN PATENT DOCUMENTS

| 115134 | 5/1942 | Australia | 524/439 |
|---|---|---|---|
| 116224 | 12/1942 | Australia | 427/388.2 |
| 694113 | 9/1964 | Canada | 524/439 |
| 737541 | 6/1966 | Canada | 524/439 |
| 2135027 | 1/1973 | Fed. Rep. of Germany | 427/388.2 |
| 49-23830 | 3/1974 | Japan | 524/439 |
| 56-080454 | 7/1981 | Japan . | |
| 57-94059 | 6/1982 | Japan | 524/439 |
| 58-101049 | 6/1983 | Japan | 427/388.1 |
| 59-152940 | 8/1984 | Japan | 524/439 |
| 59-152940 | 8/1984 | Japan | 524/439 |
| 59-196242 | 11/1984 | Japan . | |
| 59-219354 | 12/1984 | Japan . | |
| 61-139436 | 6/1986 | Japan | 427/388.1 |
| 61-237634 | 10/1986 | Japan . | |
| 61-242671 | 10/1986 | Japan | 427/409 |
| 63-205182 | 8/1988 | Japan | 427/409 |

OTHER PUBLICATIONS

Coulson et al., "Internal & External Protection of Pipes", Innsbruck, Austria, Oct. 25-27, 1983.

Primary Examiner—Shrive Beck
Assistant Examiner—Terry J. Owens

[57] ABSTRACT

Corrosion of metals and cathodic disbondment of coated metals, especially steel, iron and aluminum, are reduced by coating the metals with a composition of 1-70% by weight of a modified polyolefin and 30-99% by weight of metallic zinc. The modified polyolefin is obtained by grafting a polyolefin with an ethylenically unsaturated aliphatic carboxylic acid or derivative thereof, the polyolefin being a homopolymer or copolymer of a $C_2$-$C_{12}$ hydrocarbon alpha-olefin.

15 Claims, No Drawings

REDUCTION OF CORROSION OF METALS

The present invention relates to reduction of corrosion of metals, including reduction of cathodic disbondment in coated metal substrates, in which the metal is coated with a polyolefin composition. In particular, the present invention relates to compositions for such coating and to the resultant coated metal articles.

Metal articles, including metal pipes, are used in a variety of end-uses that involve contact with an environment that may result in corrosion of the metal and/or cathodic disbondment of any coating on the metal, both of which are generally referred to herein as corrosion. Such end-uses may involve storage of liquids and/or transportation of liquids from one location to another location, and the metal may be above ground level or buried underground, or partly above ground and partly buried. The corrosion may have many causes, including water, acidic matter in the soil and acidic matter in the atmosphere that comes into contact with the metal.

In order to reduce the rate of corrosion, or to seek to eliminate corrosion, the metal may be coated with a variety of materials e.g. corrosion-resistant paints, tars or bitumen, or thermoplastic polymers. A study of external pipeline coatings was presented at the 5th International Conference on the Internal and External Protection of Pipes, Innsbruck, Austria, Oct. 25-27, 1983 by K.E.W. Coulson and D.G. Temple of NOVA, An Alberta Corporation. Tests of a variety of coatings, including coal tar/enamel, coal tar/polyester, extruded or tape polyethylene, polyvinyl chloride tape, epoxy and polyurethane coatings were reported. One of the tests deemed essential in evaluation of the performance of metal pipe was measurement of cathodic disbondment.

Japanese patent application No. 56 080 454 of Toyo Kohan K.K., published July 01, 1981 describes the lamination of tin, steel and aluminum plate with thermoplastic polymers using an adhesive layer to bond the metal plate to the polymer. The adhesive contained powder of at least one compound of a metal of Group IA or Group IIA of the Periodic Table. Examples of the compounds include oxides, hydroxides, carbonates, bicarbonates borates, phosphates, silicates, aluminates and the like. It is further disclosed that, alternatively, the metal compound may be admixed into the thermoplastic polymer.

Japanese patent application No. 59 219 354 of Mitsubishi Chemical Industries, published October 12, 1984 discloses the use of compositions of modified polyolefins grafted with unsaturated carboxylic acids or their anhydrides, optionally admixed with unmodified polyolefins, with 0.5–40 parts by weight of antirust pigments having a pH below about 7. Examples of the antirust pigments are aluminum dihydrogen tripolyphosphate and aluminum phosphorus molybdate, optionally admixed with zinc compounds e.g. zinc oxide.

Japanese patent application No. 59 196 242 of Idemitsu Petrochemical K.K., published November 07, 1984 discloses the use of compositions of polyethylene modified with an unsaturated carboxylic acid, or derivative thereof, admixed with polybutene-1 in the coating of steel pipes to improve adhesion and environmental stress crack resistance of the coating.

Japanese patent application No. 61 237 634 of Daido Kohan K.K., published April 13, 1986 discloses a metallic material whose surface has been treated with a chemical solution containing chromic acid, silica gel and phosphoric acid, and then a polyolefin film adhered to the treated surface using an adhesive of polypropylene modified with maleic anhydride.

A composition of graft-modified polyethylene and metallic zinc has now been found which, when coated on metals, provides resistance to corrosion and/or cathodic disbondment.

Accordingly, the present invention provides a composition comprising (i) 1-70 percent, by weight of the composition, of a modified polyolefin, said modified polyolefin having been obtained by grafting a polyolefin with an ethylenically unsaturated aliphatic carboxylic acid, or derivative thereof, said polyolefin being selected from the group consisting of homopolymers and copolymers of $C_2$–$C_{12}$ hydrocarbon alpha-olefins, such that the amount of carboxylic acid or derivative thereof in the grafted copolymer is 0.01–10% by weight of the composition, and (ii) 30–99 percent by weight of metallic zinc.

The present invention also provides a method of providing protection against corrosion of metals and cathodic disbondment of coated metals comprising:

(a) coating a metal substrate selected from the group consisting of iron, steel and aluminum with a molten primer composition, said composition comprising (i) 1-70 percent, by weight of the composition, of a modified polyolefin, said modified polyolefin having been obtained by grafting a polyolefin with an ethylenically unsaturated aliphatic carboxylic acid, or derivative thereof, said polyolefin being selected from the group consisting of homopolymers and copolymers of $C_2$–$C_{12}$ hydrocarbon alpha-olefins, such that the amount of carboxylic acid or derivative thereof in the grafted copolymer is 0.01–10% by weight of the composition, and (ii) 30–99 percent by weight of metallic zinc;

(b) optionally, coating the primer composition with a polyolefin composition, and (c) cooling the resultant coated metal substrate.

In a preferred embodiment of the method of the present invention, the polyolefin composition is comprised of polypropylene, polybutene-1 and/or polyethylene.

The present invention also provides a coated metallic substrate comprising a substrate formed from a metal selected from the group consisting of iron, steel and aluminum, said pipe having at least one surface thereof coated with a primer composition and, optionally, additionally coated with a polymer composition, said primer composition comprising (a) 1-70 percent, by weight of the primer composition, of a modified polyolefin, said modified polyolefin having been obtained by grafting a polyolefin with an ethylenically unsaturated aliphatic carboxylic acid, or derivative thereof, said polyolefin being selected from the group consisting of homopolymers and copolymers of $C_2$–$C_{12}$ hydrocarbon alpha-olefin, such that the amount of carboxylic acid or derivative thereof in the grafted copolymer is 0.01–10% by weight of the composition, and (b) 30–99 percent by weight of metallic zinc; and said polymer composition being comprised of a polyolefin.

In a preferred embodiment of the composition, method and coated substrate of the present invention, the ethylenically unsaturated carboxylic acid and derivative thereof are maleic acid and maleic anhydride, respectively.

In a further embodiment of the composition, method and coated metal substrate of the present invention, the graft copolymer is in the form of a blend of graft copolymer with hydrocarbon polymer, the resultant blend containing 0.05 to 0.5% by weight of an ethylenically unsaturated carboxylic acid, or derivative thereof.

The present invention relates to coated metal substrates, and to compositions for coating the substrates. The substrates may be of any convenient shape, including in the form of pipes, and will generally be described herein with reference to pipes. The pipes may be of any diameter; e.g., of relatively small diameter, such as about 2.5 cm internal diameter, or of larger diameter, such as internal diameters of up to 15 cm or more. The pipes are formed from iron or, especially, steel using conventional techniques for the forming of such pipes. The pipes may also be aluminum pipes. The invention will be particularly described herein with reference to steel pipes.

The steel of the pipes may be treated by conventional techniques for reduction of corrosion. For example, the steel may be silane or phosphate conversion treated or the like.

The steel pipes are coated, according to the invention, with a primer composition and then, optionally, with a polymer composition. The primer composition is comprised of a modified polyolefin and zinc. The modified polyolefin is formed by grafting an ethylenically unsaturated aliphatic carboxylic acid, or derivative thereof, onto a polyolefin. The polyolefin is selected from the group consisting of homopolymers and copolymers (including terpolymers and the like) of $C_2$-$C_{12}$ hydrocarbon alpha-olefins. The preferred hydrocarbon polymers are polymers are homopolymers of ethylene and polypropylene, and copolymers of ethylene and at least one $C_4$-$C_{10}$ hydrocarbon alpha-olefin. The modified polyolefin should have a melt index in the range of 0.05 to 100 dg/min., as measured by the procedures of ASTM D-1238 (Condition E).

The preferred grafting monomers are maleic acid and maleic anhydride. As noted hereinafter, the modified polyolefin may be blended with ungrafted polyolefin in order to obtained a composition containing the required level of grafted monomers.

Techniques for the preparation of modified polyolefins are known in the art, preferred examples of which are disclosed in U.S. Pat. No. 4 737 547 of G. White, issued April 12, 1988 and U.S. Pat. No. 4 612 155 of C. S. Wong and R. A. Zelonka, issued September 16, 1986. Modified polyolefins, which may also be referred to as grafted copolymers, may also be prepared by thermal reaction of maleic anhydride with polyethylene at temperatures of at least about 375° C.

The primer composition also contains metallic zinc. The zinc may be in the form of particles, flakes or other comminuted shapes, and should be of a fine particle size to facilitate preparation of a primer coating composition having uniform properties. For example, the zinc particles should be of a particle size that is less than about 400 microns, and preferably less than 60 microns.

An unmodified hydrocarbon polymer may be blended into the primer composition. The unmodified polymer is a hydrocarbon polymer, especially a homopolymer of ethylene or a copolymer of ethylene and at least one $C_4$-$C_{10}$ hydrocarbon alpha-olefin.

The primer composition contains 0.01 to 10 percent, based on the weight of the primer composition, of carboxylic acid groups (or of the groups of the derivative of the ethylenically unsaturated carboxylic acid). In preferred embodiments, the primer composition contains 0.05 to 0.5% by weight and especially 0.1 to 0.2% by weight of such groups. In addition, the primer composition contains 30-99% by weight of the composition of metallic zinc, and conversely 1-70% by weight of the polymeric component. In preferred embodiments, the primer composition contains 50-90% and especially 65-80% by weight of metallic zinc, and conversely 10-50% by weight and especially 20-35% by weight of the polymeric component.

The compositions of the present invention may be obtained by blending the metallic zinc with molten polymer. For example, the polymeric components of the composition may be fed to an extruder equipped with a suitable mixing screw and the zinc e.g. zinc dust, may be fed directly into a zone of the extruder in which the polymeric components are in a molten condition. The resultant composition, which should have been admixed sufficiently to provide a uniform composition, may then be extruded from the extruder and pelletized.

The pipe coated with primer composition may be further coated with a polymeric composition, especially a polyolefin composition. The polymeric composition is intended primarily to provide protection to the primer composition e.g. with respect to abrasion. A variety of polymeric compositions may be applied, and in preferred embodiments the compositions are comprised of polyethylene, polypropylene, polybutene-1 and/or polyoctene.

The primer and polymeric compositions may be applied to the steel pipe by conventional techniques, including use of extrusion coating techniques, fluidized bed, electrostatic spraying, flame spraying and powder coating techniques.

The coated steel pipes may be used in the manner known for steel pipes. The pipes may be used above ground level, in which event antioxidants, ultra violet and other stabilizers for the polymer composition should be added to the composition; the preferred stabilizer is carbon black. Pigments may also be added to the polymeric composition. Alternatively, the coated pipe may be buried underground. In that event, it may still be desirable to add stabilizers for the polymer to the composition, especially antioxidants and carbon black.

In the examples hereinafter, the following polymers were used:

A: a high density homopolymer of ethylene, having a density of 0.960 g/cm$_3$ and a melt index of 5.0 dg/min;

B: a high density ethylene/butene-1 copolymer, having a density of 0.950 g/cm$_3$ and a melt index of 14.5 dg/min;

C: a high density homopolymer of ethylene, having a density of 0.956 g/cm$_3$ and a melt index of 1.0 dg/min;

D: a linear low density ethylene/butene-1 copolymer, having a density of 0.924 g/cm$_3$ and a melt index of 5.1 dg/min;

E: a linear low density ethylene/butene-1 copolymer, having a density of 0.920 g/cm$_3$ and a melt index of 1.4 dg/min;

F: a linear low density ethylene/butene-1 copolymer, having a density of 0.923 g/cm$_3$ and a melt index of 2.5 dg/min;

G: a very low density ethylene/butene-1/octene-1 copolymer, having a density of 0.910 g/cm$^3$ and a melt index of 1.8 dg/min;

H: an ethylene/propylene/diene (EPDM) polymer, having a density of 0.87 g/cm$^3$ and a melt flow rate of 0.2 dg/min*;

*measured at 230° C.

J: a grafted homopolymer of propylene, having a melt flow rate of 7.8 dg/min* and a maleic anhydride content of 0.1% by weight;

K: a grafted high density ethylene/butene-1 copolymer, having a density of 0.955 g/cm$^3$, a melt index of 1.6 dg/min and a maleic anhydride content of 1.0% by weight;

L: a grafted linear low density ethylene/butene-1 copolymer, having a density of 0.920 g/cm$^3$, a melt index of 0.1 dg/min and a maleic anhydride content of 1.0% by weight;

M: a grafted linear low density ethylene/butene-1 copolymer, having a density of 0.930 g/cm$^3$, a melt index of 46 dg/min and a maleic anhydride content of 1.0% by weight;

N: an ethylene/methacrylic acid (15%) copolymer, having a density of 0.97 g/cm$^3$ and a melt index of 21 dg/min;

P: an ionomer consisting of an ethylene/methacrylic acid (9%) copolymer which has been partially neutralized with zinc, having a density of 0.95 g/cm$^3$ and a melt index of 5.5 dg/min;

Q: a grafted copolymer of propylene, having a melt flow rate of 25 dg/min* and a maleic anhydride content of 0.6% by weight; and

*measured at 230° C.

R: a linear low density ethylene/butene-1 copolymer, having a density of 0.924 g/cm$^3$ and a melt index of 20 dg/min.

Cathodic disbondment was measured as follows: a cold-rolled steel plate was sand-blasted to a white finish, loose particles on the surface being washed away with 1,1,1 trichloroethane. A 250 micron plaque of the composition to be tested was placed on the cleaned dried plate and the resulting structure was placed in a press at 180° C. for 3 minutes and then pressed at 70 kg/cm2 for one minute. The procedure was then repeated so as to apply a 250 micron thick coating of Polymer C. A 6 mm holiday was then made near the center of the plaque, which was then immersed in a 3% by weight solution of sodium chloride at 65° C.; a potential of −1.5 volts was maintained across the plaque, with reference to a calomel electrode, for a period of 48 hours. The plaques was then inspected to determine if new holidays had formed and the total area of disbondment was measured.

The present invention is illustrated by the following examples:

EXAMPLE I

A Brabender Plasticorder TM mixer was heated to a temperature of 200° C. and was charged with 35g of a blend of Polymer K (14g), Polymer A (13.8g), Polymer F (7g) and 0.2g of an antioxidant concentrate. The mixture was fluxed for a period of 5 minutes until all of the polymer had became molten. 50g of zinc dust (6 micron particle size) was then added, gradually, into the mixer, and the resulting mixture was fluxed for a further 5 minutes. The resultant primer is referred to below as Sample I.

Additional samples were prepared as follows:

II: As a comparative example, a blend of Polymer A (40%), Polymer K (40%) and Polymer F (20%) was prepared in the Brabender Plasticorder at 180° C.;

III: As a comparative example, a blend of Polymer B (35.7%), Polymer K (36.4%), polymer D (18.2%), carbon black concentrate (5.2%) and antioxidant concentrate (4.5%) was melt blended in an extruder. The resultant sample was coated on (a) a sand blasted cold rolled steel plate, (b) a zinc phosphate treated steel plate, identified as B40 DIW and obtained from Advanced Coating Technologies, Inc. of Hillsdale, Mich., U.S.A., and (c) a zinc phosphate treated and painted (grey) steel plate (identified as B40 P60 DIW, Bonderite TM 40, and obtained from Advanced Coating Technologies, Inc.).

IV: A sample was prepared using the procedure for Sample I, from Polymer E (1.7%), Polymer K (4.7%), Polymer H (2.6%), 0.1% of antioxidant concentrate and 90.9% zinc dust.

V: A sample was prepared using the procedure for Sample I, from Polymer E (4.2%), Polymer L (9.6%), Polymer H (6%), 0.2% of antioxidant concentrate and 80% zinc dust.

VI: A sample was prepared using the procedure for Sample I, from Polymer D (11.8%), Polymer K (12%), Polymer H (6%), 0.2% of antioxidant concentrate and 70% zinc dust.

VII: A sample was prepared using the procedure for Sample I, from Polymer D (10.3%), Polymer K (14.0%), Polymer H (10.5%), 0.2% of antioxidant concentrate and 65% zinc dust.

VIII: A sample was prepared using the procedure for Sample I, from Polymer D (17.8%), Polymer K (12%), 0.2% of antioxidant concentrate and 70% zinc dust.

IX: A sample was prepared using the procedure for Sample I, from Polymer G (17.8%), Polymer K (12%), 0.2% of antioxidant concentrate and 70% zinc dust.

X: A sample was prepared using the procedure for Sample I, from Polymer Q (29.8%), 0.2% of antioxidant concentrate and 70% zinc dust, except that the primer composition was coated with the propylene copolymer.

XI: A sample was prepared using the procedure for Sample I, from Polymer J (29.8%), 0.2% of antioxidant concentrate and 70% zinc dust, except that the primer composition was coated with the propylene copolymer.

XII: A sample was prepared using the procedure of Example I, from Polymer M (12.0%), Polymer R (17.8%), 0.2% antioxidant concentrate and 70% zinc dust.

XIII: An identical plate was prepared as in Sample IX, except that the top coat was omitted.

XIV: A sample was prepared as in IX, except that the zinc dust (6 micron particle size) was replaced with a zinc powder (45 micron particle size).

XV: A sample was prepared as in IX, except that the zinc dust (6 micron particle size) was replaced with a zinc flakes (840 micron particle size).

XVI: As a comparative example, a sample was prepared using the procedure for Sample I, from Polymer N (30%) and zinc dust (70%).

XVII. As a comparative example, a sample was prepared using the procedure for Sample I, from Polymer P (30%) and zinc dust (70%).

XVIII: As a comparative example, a sample was prepared using the procedure for Sample I, from Polymer K (40%), Polymer G (57.8%) and antioxidant concentrate (2.5%).

Further details and the results obtained are given in Table I.

TABLE I

| Sample No. | Cathodic Disbondment Diameter (mm) |
|---|---|
| I | 14 |
| II | 26 |
| IIIa | 28 |
| IIIb | 28 |
| IIIc | 20 |
| IV | 12 |
| V | 13.5 |
| VI | 9.2 |
| VII | 12.1 |
| VIII | 10.4 |
| IX | 7.4 |
| X | 11 |
| XI | 17.5 |
| XII | 15.9 |
| XIII | 8.0 |
| XIV | 9.2 |
| XV | catastrophic failure |
| XVI | catastrophic failure |
| XVII | catastrophic failure |
| XVIII | 29 |

This Example shows that use of the primer compositions containing metallic zinc reduces cathodic disbondment of steel pipe under the test conditions used.

In Samples No. XV, XVI and XVII, the diameter of cathodic disbondment was in excess of 60 mm. Comparative samples IIIa, IIIb and IIIc show that the compositions of the present invention provide better protection against cathodic disbondment than do polyolefin coatings over zinc phosphate coatings e.g. conventional treatments.

Samples XVI and XVII show that other related polymers viz. ionomers and ethylene/methacrylic acid copolymers, do not provide the protection of the present invention.

Sample XV shows the detrimental effect of use of metallic zinc having a large particle size.

EXAMPLE II

Plaques having a thickness of 150 microns were prepared from the blend of Sample IX of Example I. A sheet of aluminum having a thickness of 175 microns was sandwiched between two plaques and pressed at 180° C. for 3 minutes under a pressure of 75 kg/cm2 in a press. One side of the resultant laminate was inscribed with two intersecting straight lines at an angle of 30 degrees, such that the aluminum was exposed to the atmosphere.

One laminate prepared as above was immersed in a 1N aqueous solution of sodium hydroxide for a period of 24 hours, and another such laminate was immersed in a 1N aqueous solution of hydrochloric acid for a period of 20 hours.

It was found that the sodium hydroxide had dissolved the aluminum to a width of 2 mm along the edge of the inscription but that no further delamination had occurred. Similarly, the hydrochloric acid had dissolved less than 0.5 mm of the aluminum but without further delamination.

The above procedure was repeated using plaques formed from a blend of 77.5% by weight of Polymer, 20% by weight of Polymer K and 2.5% by weight of the antioxidant concentrate, each of which is described in Example I. It was found that the sodium hydroxide dissolved 3 mm of aluminum and caused an additional 2mm width of delamination, for a total of 7 mm in width, whereas the hydrochloric acid had dissolved 2 mm of the aluminum without delamination.

This example shows that a composition of the invention containing zinc exhibited superior protection to the substrate than a similar composition that did not contain zinc.

I claim:

1. A method for providing protection against corrosion of metals and cathodic disbondment of coated metals comprising:
  (a) coating a metal substrate selected from the group consisting of iron, steel and aluminum with a molten primer composition, said primer composition consisting essentially of (i) 1-70 percent, by weight of the composition, of a modified polyolefin, said modified polyolefin having been obtained by grafting a polyolefin with ethylenically unsaturated aliphatic carboxylic acid, or derivative thereof, said polyolefin being selected from the group consisting of homopolymers of ethylene, homopolymers of propylene and copolymers of ethylene and at least one $C_4$-$C_{10}$ hydrocarbon alpha-olefin, such that the amount of carboxylic acid or derivative thereof in the modified polyolefin is 0.01-10 percent by weight of the composition and (ii) 30-99 percent by weight of metallic zinc; and
  (b) cooling the resultant coated metal substrate.

2. The method of claim 1 in which the primer coating is coated with a polyolefin composition.

3. The method of claim 1 in which the ethylenically unsaturated carboxylic acid and derivative thereof are maleic acid and maleic anhydride, respectively.

4. The method of claim 1 in which the zinc has a particle size of less than 60 microns.

5. The method of claim 1 in which the ethylenically unsaturated carboxylic acid and derivative thereof are maleic acid and maleic anhydride, respectively, the amount of carboxylic acid or derivative thereof in the modified polyolefin being 0.05-0.5% by weight of the primer composition.

6. The method of claim 2 in which the polyolefin composition used to coat the primer coating is selected from the group consisting of homopolymers of ethylene and copolymers of ethylene and at least one $C_4$-$C_{10}$ hydrocarbon alphaolefin.

7. A coated metallic substrate comprising a substrate formed from a metal selected from the group consisting of iron, steel and aluminum, said substrate having at least one surface thereof coated with a primer composition, said primer composition consisting essentially of (a) 1-70 percent, by weight of the primer composition, of a modified polyolefin, said modified polyolefin having been obtained by grafting a polyolefin with an ethylenically unsaturated aliphatic carboxylic acid, or derivative thereof, said polyolefin being selected from the group consisting of homopolymers of ethylene, homopolymers of propylene and copolymers of ethylene and at least one $C_4$-$C_{10}$ hydrocarbon alpha-olefin, such that the amount of carboxylic acid or derivative thereof in the modified polyolefin is 0.01-10 percent by weight of the composition and (b) 30-99 percent by weight of metallic zinc.

8. The coated substrate of claim 7 in which the primer coating is coated with a polyolefin composition.

9. The coated substrate of claim 7 in which the ethylenically unsaturated carboxylic acid and derivative thereof are maleic acid and maleic anhydride, respectively.

10. The coated substrate of claim 7 in which the zinc has a particle size of less than 60 microns.

11. The coated substrate of claim 7 in which the ethylenically unsaturated carboxylic acid and derivative thereof are maleic acid and maleic anhydride, respectively, the amount of carboxylic acid or derivative thereof in the grafted copolymer being 0.05-0.5% by weight of the composition.

12. A coated metallic substrate comprising a substrate formed from a metal selected from the group consisting of iron, steel and aluminum, said substrate having at least one surface thereof coated with a primer composition, said primer composition consisting essentially of (a) 1-70 percent, by weight of the primer composition, of a modified polyolefin, said modified polyolefin having been obtained by grafting a polyolefin with an ethylenically unsaturated aliphatic carboxylic acid, or derivative thereof, said polyolefin being selected from the group consisting of homopolymers of ethylene, homopolymers of propylene and copolymers of ethylene and at least one $C_4$-$C_{10}$ hydrocarbon alpha-olefin, such that the amount of carboxylic acid or derivative thereof in the modified polyolefin is 0.01-10 percent by weight of the composition, (b) hydrocarbon polymer and (c) 30-99 percent by weight of metallic zinc.

13. The coated substrate of claim 12 in which the hydrocarbon polymer is selected from the group consisting of homopolymers of ethylene and copolymers of ethylene and at least one $C_4$-$C_{10}$ hydrocarbon alpha-olefin.

14. A method of providing protection against corrosion of metals and catholic disbondment of coated metals comprising:

(a) coating a metal substrate selected from the group consisting of iron, steel and aluminum with a molten primer composition, said primer composition consisting essentially of (i) 1-70 percent, by weight of the composition, of a modified polyolefin, said modified polyolefin having been obtained by grafting a polyolefin with ethylenically unsaturated aliphatic carboxylic acid, or derivative thereof, said polyolefin being selected from the group consisting of homopolymers of ethylene, homopolymers of propylene and copolymers of ethylene and at least one $C_4$-$C_{10}$ hydrocarbon alpha-olefin, such that the amount of carboxylic acid or derivative thereof in the modified polyolefin is 0.01-10 percent by weight of the composition, (ii) hydrocarbon polymer and (iii) 30-99 percent by weight of metallic zinc; and (b) cooling the resultant coated metal substrate.

15. The method of claim 14 wherein the hydrocarbon polymer is a homopolymer of ethylene or a copolymer of ethylene and at least one $C_4$-$C_{10}$ hydrocarbon alpha-olefin.

* * * * *